WITNESSES
William S. Klein
Viki E. Lye

INVENTORS
Harry R. Lubcke
Harold W. Jury

TELEVISION EQUIPMENT

Filed Feb. 20, 1947 4 Sheets-Sheet 2

WITNESSES

William S. Klein
Viki E. Rye

INVENTORS

Harry R. Lubcke
Harold W. Jury

WITNESSES

William S. Klein

Vicki E. Rye

INVENTORS

Harry R. Lubcke

Harold W. Jury

WITNESSES

William S. Klein

Vicki E. Rye

INVENTOR.

Harry R. Lubcke

Harold W. Jury

Patented Sept. 22, 1953 2,653,185

UNITED STATES PATENT OFFICE 2,653,185

TELEVISION EQUIPMENT

Harry R. Lubcke, Hollywood, and Harold W. Jury, Burbank, Calif., assignors to Thomas S. Lee Enterprises, Inc., Los Angeles, Calif., a corporation of California Application February 20, 1947, Serial No. 729,758

22 Claims. (Cl. 178—6.8)

This invention relates to electrical apparatus for accomplishing television in which radiant energy is intercepted from the field of view and information regarding the same presented to the observer by visual means.

An object of this invention is to accomplish television by intercepting radiant visible energy from the field of view.

Another object of this invention is to accomplish television by intercepting radiant heat energy from the field of view.

Another object of this invention is to accomplish television by intercepting radiant ultra-violet energy from the field of view.

Another object of this invention is to remove spurious responses from the indication of apparatus of this sort.

Still another object of this invention is to provide a compact mechanical scanning device capable of executing rectilinear scansions.

Still another object of this invention is to provide means for synchronizing the motion of the electron beam of a cathode-ray tube with that of a mechanical scanning element.

Still another object of this invention is to provide means for electrically removing the effects of spurious mechanical vibration.

Still another object of this invention is to provide mechanical scanning means of relatively long life, freedom from readjustment, and of accurate performance.

The ways in which these objects are attained are illustrated in the accompanying drawings, in which.

The spectrum of radiant energy to which this apparatus will respond is determined by the spectral region of sensitivity of the detector in the camera. For visibile energy, glass optics and a photoelectric cell are used. For infra-red energy, including the far infra-red, rocksalt optics and the radiant energy detector described in our copending application, Serial Number 630,532, filed November 23, 1945, are used. For ultra-violet energy, quartz optics and a quartz contained photoelectric surface are used.

For a directly electrically driven scanner rather than the mechanical one described herein, the electromechanical device described in the Lubcke copending application, Serial Number 630,533, filed November 23, 1945, is used.

In apparatus of this sort, we have found it necessary to treat the apparatus as an operative whole. The characteristics of the electrical elements of the device have important relations to the characteristics of the mechanical and the optical elements. Indiscriminate combinations of variants, although apparently acceptable to one skilled in the art, have invariably resulted in performance which is so poor as to constitute nonworkability in the light of this invention.

It is to be noted that an important accomplishment of this invention is that of "unseen television"; i. e., the presentation of a visual image to the eye of scenes delineated by radiation of infra-red or ultra-violet wavelengths. When the far infra-red detector of our copending application, Serial No. 630,532, is used the inherent heat radiation of matter above the datum of absolute zero provides sufficient "illumination" to televise the scene of itself; no artificial illumination is needed and the process is accomplished in darkness or any degree of visual light. The apparatus discerns the temperature differentials across the field of view. Such differentials occur as actual temperature differences or as different coefficients of thermal emission depending upon the nature of the exposed surface. For instance, a piece of wood against an area of concrete can be distinguished although both substances may have been in a closed room for weeks and are therefore at the same temperature according to any other known means of measurement. Bodies which persist at a slightly elevated temperature, such as the human body, are strongly identified objects, regardless of clothing or similar covering.

Figures 1, 2:
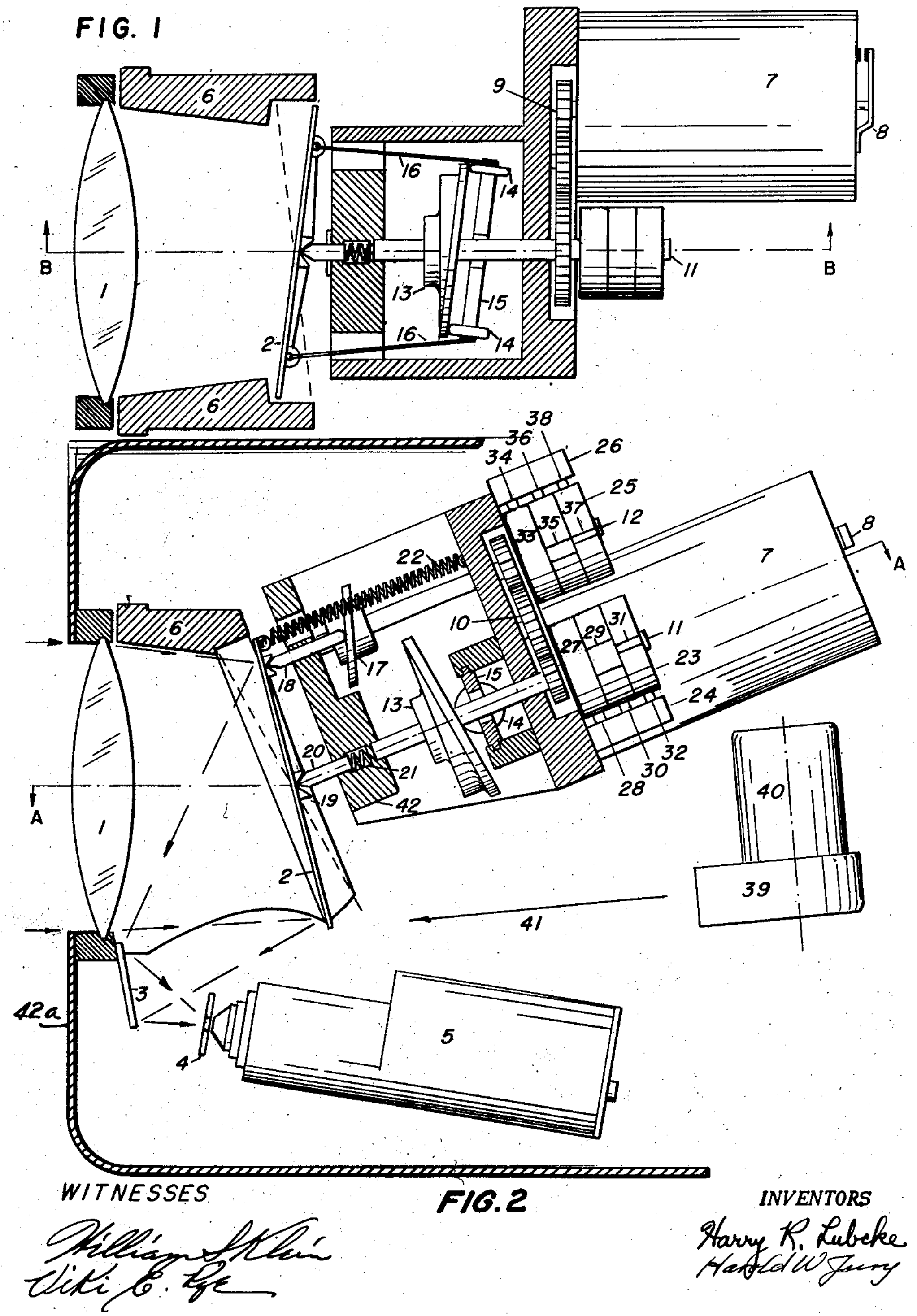
Fig. 1 shows the plan view of the camera optical system and scanner, in partial section along line A—A of Fig. 2.
Fig. 2 shows an elevation view of the same, also in partial section along line B—B of Fig. 1.

Referring now to Figs. 1 and 2 the optical system of the camera is comprised of lens 1, movable mirror 2, stationary mirror 3, sensitive area 4 of detector 5 and sidescan shield 6. The distances and the focal length of lens 1 are such that an image of the field of view is formed in the plane of the sensitive area 4. Motion of mirror 2 causes the image to be moved over the sensitive area 4. Rectilinear motion of mirror 2 from side to side and rectilinear motion vertically as a slow nod and a rapid return causes the field of view to be scanned in two dimensions. The sensitive area 4 is the size of one picture element. The trace of the scan, the raster, in shown in Fig. 7.

The housing, which contains the numerous elements of the camera, is shown as 42a in Fig. 2.

Figure 3:
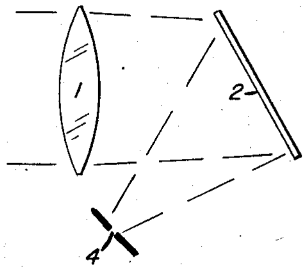
Fig. 3 shows an alternate arrangement of the optical system.

This type of optical system has the advantage of high optical efficiency in a small space. The lens 1 can easily be of f1.5 speed. The small space required is apparent. The mirror 3 is used to give a desirable form to the camera. It can be eliminated and the detector element moved around to place the sensitive area 4 thereof in the position formerly occupied by mirror 3. The focal length of the lens is decreased or the distances between elements 1, 2 and 4 increased so that an image is formed in the plane of aperture 4 as before. The arrangement is shown in Fig. 3.

The mirrors 2 and 3 are sufficiently large to reflect the whole cone of radiant energy formed by lens 1. Since the mirror 2 moves it must be slightly larger than the cone of radiant energy. Otherwise, upon the extremes of the motion some of the energy is lost and a spurious signal is created. When the mirror is made slightly larger, however, the sensitive area of the detector "sees" beyond the boundaries of the incoming lens cone and creates another spurious signal which we have discovered and have called "sidescan." This is caused by the sensitive area of the detector seeing part of lens mounting ring and part of the inside of the camera case. For a camera operating in the visual or ultra-violet spectrum the mounting ring appears as a dark signal; for a camera operating in the infra-red spectrum the mounting ring appears as a bright signal, since the camera case is usually warmer than the field of view.

Now if a perfectly reflecting surface surrounded the volume of the incoming cone of radiant energy between the movable mirror and the lens ring the sensitive area could not "see" this but would only see the field of view. Since the rays involved impinge upon the reflecting surface at nearly grazing incidence the reflection from a surface which can be realized in practice is excellent and the element functions efficiently in practical embodiments. This surface is the sidescan shield 6 shown in Figs. 1 and 2 and it accomplishes one of the objects of this invention. For radiant heat energy operation the sidescan shield is made of relatively thick material as shown and of a substance having good thermal conductivity, such as aluminum. This prevents temperature differentials across the working surface, which would, if present, cause minor spurious responses. This preferred form of sidescan shield is thick for an additional reason; to resist mechanical deformation. We have found that a relatively thin shield of sheet metal is too easily deformed in installation to allow easy duplication of results when a number of equipments of the same design are constructed. The variation is of large magnitude; sufficient to cause substantial nonworkability in the light of this invention.

It will be further noted in Figs. 1 and 2 that the sidescan shield extends beyond the plane of the movable mirror 2 and that a lip of the shield projects in front of the mirror. This prevents the sensitive area from seeing objects behind the movable mirror. Such objects are either at an effectively different illumination level for ultra-violet or visible light or at an effectively different temperature for infra-red energy and the obscuring and disclosing of the same by the motion of the mirror generates a video signal having the same unwanted characteristics as a sidescan video signal. In a preferred embodiment the mirror 2 and the sidescan shield 6 are made of the same material, say aluminum, and the whole optical surfaces of each are polished. Thus when an edge of mirror 2 moves back in carrying out the scanning process it discloses only more polished aluminum surface of the adjacent part of the sidescan shield.

The mechanical scanning device capable of executing rectilinear scansions is located to the right of (behind) the movable mirror 2, in Figs. 1 and 2. The prime mover is conveniently an electric motor 7, having a constant speed governor 8, although an air driven prime mover is also suitable. A continuing gear train 9—10, reduces the prime mover speed to drive the horizontal camshaft 11 and to further considerably reduce the speed to drive the "vertical" (deflection) camshaft 12.

Axial cam 13 is rigidly attached to horizontal camshaft 11. Ball bearing followers 14 roll upon the cam surface and, being attached to crossbar 15 cause the latter to execute an oscillatory motion. The cam is preferably cut with a constant rate of drop and rise save a curved portion at the ends of each throw of the order of 18° which reduces the inertia forces during the turn-around period. The cam surface lies approximately in a plane oblique to the axis of the shaft so that an across and a back motion is executed in one resolution. Plotted as a function of time the waveshape of the motion is triangular. Substantially rigid links 16 connect the extremities of the cross-bar 15 and the mirror 2. In this way the mirror is given a relatively rapid horizontal motion.

Gear train 10 reduces the speed of rotation of shaft 11 to a considerably lower value for the vertical camshaft 12. For example, if the television image is to have 30 lines in the raster the speed reduction required is 15 to 1. The vertical cam 17 (Fig. 2) is also of the axial type and is cut with a gradual linear rise and rapid fall, the direction of rotation being such that mirror 2 executes a slow downward tilt and a rapid upward return. This motion is imparted to the mirror through follower 18.

Socket 19, attached to mirror 2, joint 20 and spring 21 comprise an improved spring pressure universal joint. This serves to keep links 16 always under tension and automatically adjusts for inescapable wear. It is to be noted that follower 18 acts upon the mirror through an equivalent socket and in conjunction with spring 22, the latter supplying the force to accomplish the quick return.

Synchronism between the mechano-optical mechanism described and the electrical viewing portion of the apparatus is accomplished by means of the commutator-brush assemblies 23—24 and 25—26. The commutator 23 is rigidly mounted on the horizontal (deflection) camshaft 11. A conducting segment 27 extends around the periphery for the purpose of establishing an invariable ground contact by means of brush 28. Horizontal blanking segment 29 has a circumferential width of 40° and is positioned to contact brush 30 at the extreme of one horizontal excursion of mirror 2; 20° of rotation of shaft 11 before the extreme and 20° afterward. Another blanking segment located diametrically opposite to segment 29 contacts brush 30 at the other extreme of the mirror excursion in the same manner. Horizontal synchronizing segment 31 has a circumferential width of 10° and is positioned to contact brush 32 at the time of the extreme excursion of mirror 2.

Commutator 25 is rigidly mounted on the vertical (deflection) camshaft 12. A conducting segment 33 extends around the periphery for the purpose of establishing an invariable ground contact by means of brush 34. Vertical blanking segment 35 has a circumferential width of 22° and is positioned to contact brush 36 during the quick vertical return of mirror 2. There is only one such segment since the waveshape of the vertical deflection is a sawtooth rather than a triangular waveshape when plotted as a function of time in a preferred embodiment of our invention. Vertical synchronizing segment 37 has a circumferential width of 10° and is positioned to contact brush 38 at the start of the quick vertical return of mirror 2.

In Fig. 2, blower 39 is actuated by motor 40 and directs a blast of air in the direction of the arrow 41. This provides a cooling flow of air around the sidescan shield 6 and mirror 2. This is of particular benefit in the embodiment for infra-red detection. If the mirror surfaces of the sidescan shield and mirror were perfectly reflecting the temperature thereof would be immaterial. In practice, the appreciable departure from perfection causes the temperature of the material to be discerned. Slight temperature differentials between the sidescan shield and the mirror register as spurious signals because of changes in the proportion of each included in the cone of energy reaching the sensitive area at various instants during the scanning process. We have found that the air flow from blower 39 equalizes all temperatures and removes residual spurious signals.

Figures 4, 5:
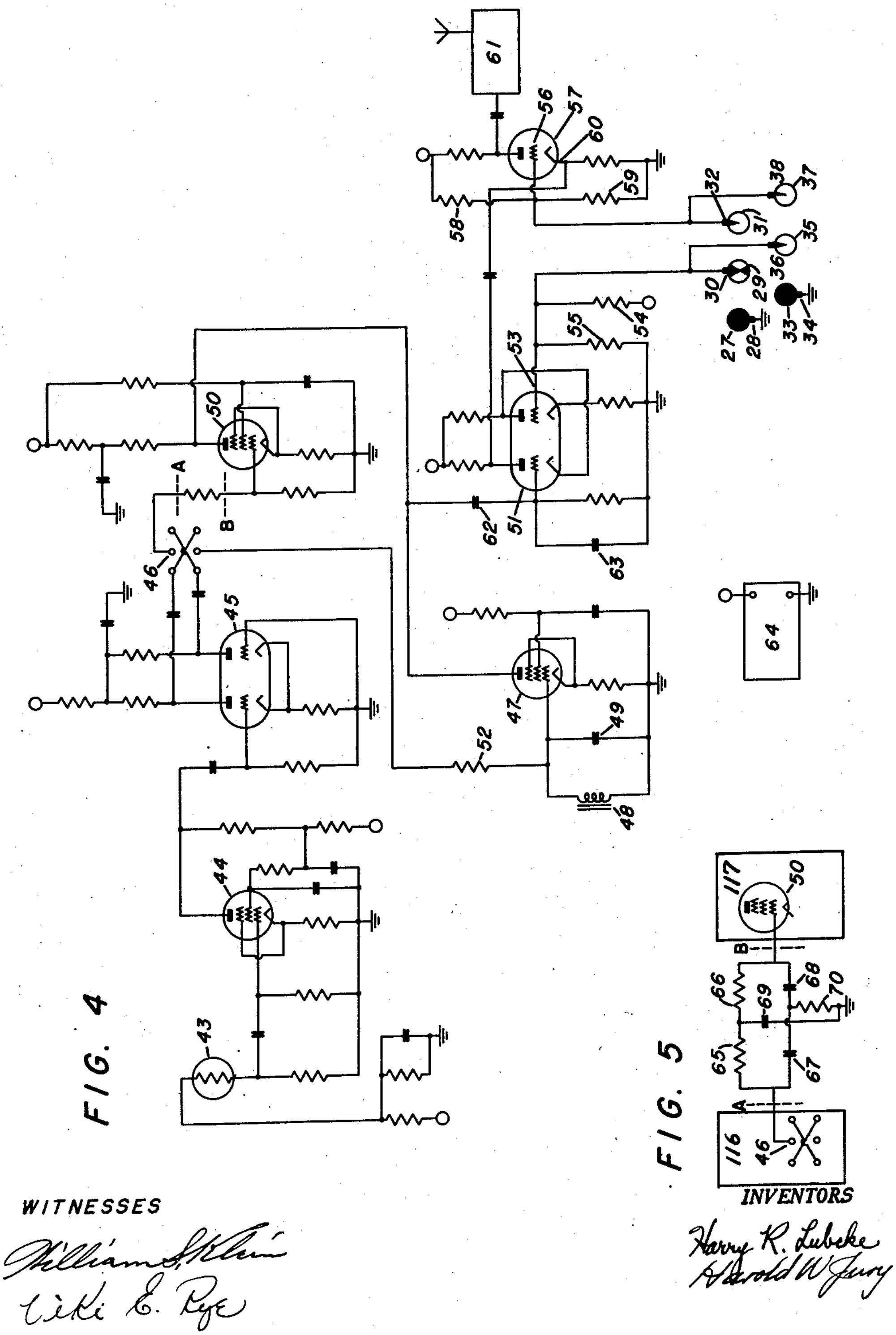
Fig. 4 shows the schematic diagram of the electrical circuits of the camera.
Fig. 5 shows an alternate schematic diagram of the electrical circuits of the camera.

Refer now to Fig. 4, the schematic diagram of the camera. Numeral 43 represents a photoelectric cell which receives variations of energy resulting from the scanning process over the field of view as registered at aperture 4 in Figs. 2 or 3. For visible or ultra-violet light the cell is positioned directly behind aperture 4. For infra-red energy this cell produces the electrical output of the detector which is fully described in our copending application, Serial Number 630,532.

Closely associated with cell 43 is the first amplifier vacuum tube 44 and the necessary auxiliary components required for a resistance-capacitance coupled amplifier stage.

A second amplifier tube 45 raises the signal level as is necessary and by means of a cathode coupled connection between the two triode units within the tube supplies both phases of signal at switch 46. This allows a bright image against a dark background visual presentation by proper positioning of the switch regardless of the phase of the original information in the field of view. In infra-red operation, an object of principal interest which is warmer than the surroundings, such as a man, can be shown as a bright object with the switch in the right hand position, while a cold object, such as an iceberg, can be shown as a bright object with the switch in the left position.

Amplifier tube 47 and accessory components comprise a spurious-vibration-signal-cancelling amplifier. Inductance 48 and capacitance 49 form a parallel resonant circuit which has an appreciable impedance only at the fundamental frequency of vibration of scanning mirror 2. Consequently, only such spurious signals as are thus created appear in the output circuit of the amplifier.

The whole signal, useful and spurious, is amplified by tube 50 and the outputs of tubes 47 and 50 are combined at the input to tube 51. The connections of switch 46 are such that tube 47 always receives an input signal of opposite polarity to the one which tube 50 receives. Thus, the spurious signal output of tube 47 is always opposite to that of tube 50 and is easily made equal in amplitude by simple adjustment of the value of equalizing resistor 52 so that complete cancellation of the spurious signal is accomplished.

The left hand triode section of tube 51 serves to amplify the signal further and as the insertion point for the blanking impulses.

The right hand triode section of tube 51 introduces the blanking pulses into the signal channel in a new manner which we find to be simple, does not involve losser resistors and does not distort the waveform of the energy which flows through the circuits.

The blanking impulses arise from the commutator and brush assemblies 23, 24 and 25, 26 shown in Fig. 2. Referring to Fig. 4 for the schematic representation, brush 28 which bears upon the contact ring 27 on the horizontal commutator and brush 34 which bears upon the contact ring 33 on the vertical commutator are both connected to ground. Brush 30, which bears on the horizontal blanking segments 29 and brush 36, which bears on the vertical blanking segment 35 are connected together, to the grid electrode 53 of the right hand triode section of tube 51 and to a voltage divider composed of resistors 54 and 55 which are connected between a source of voltage and ground. The potential of grid 53 will be that of the junction between resistors 54 and 55 except for such times as the blanking segments of the commutators ground brushes 30 or 36. Then the potential of grid 53 will be decreased to that of ground.

The potential of the plate of the right hand triode section of tube 51 is given a low value. This causes the characteristic to be short and the change of potential of grid 53 to be sufficient to swing the tube beyond cut-off and beyond saturation. This has the desired effect of removing contact irregularities between the brush and commutator segments and causing the waveform output from the tube to consist of rectangular pulses rather than approximately the same but filled with "grass" as understood in the terminology of the art.

By this process both series of blanking pulses vary the potential of grid 53 and consequently the effective resistance of the right hand triode section of tube 51. This is connected into the left hand triode of tube 51 by the anode of the former being connected to the cathode of the latter. In this way the blanking impulses are combined with the image signals and the composite signal appears at the plate of the left hand side of the triode section of tube 51.

We have found blanking impulses desirable in eliminating an otherwise abnormally large response to signals of normal intensity. The response of most detectors used in this art decreases with frequency. Consequently, the reduction of scanning rate at the ends of the rapid scan causes an abnormally large response unless the same is removed by blanking.

It is also necessary to add synchronizing pulses to the composite signal. These originate at brush 32 which contacts the horizontal synchronizing segment 31 and at brush 38 which contacts the vertical synchronizing segment 37. In the same manner as before the shorting to ground action reduces the potential of grid 56 of tube 57 from a resting value determined by the voltage divider 58—59. The video signal and blanking pulses are impressed as reductions of potential of the cathode 60 of tube 57. In the plate circuit of this tube the synchronizing pulses appear in reversed polarity, ride upon the blanking impulses and occupy the "blacker than black" amplitude region as described in the Lubcke Patent 2,055,748, dated September 29, 1936. Consequently, a complete composite video signal appears at the plate terminals of the tube.

A radio transmitter is shown diagrammatically as the rectangle 61 upon which the above combined information is modulated and radiated into space.

Fig. 5 shows an alternate arrangement for removing spurious vibration signals from the video channel. The circuit elements between dotted lines A and B replace the amplifier tube 47, filter elements 48 and 49, resistor 52 and auxiliary components associated with the spurious-vibration-signal-cancelling amplifier shown in Fig. 4. Rectangle 116 represents elements 43 to 46 of Fig. 4 and rectangle 117 represents elements 50 to 64 of Fig. 4, thus constituting an operative whole.

The resistor-capacitor elements 65 to 70 form a bridge circuit. A narrow band-elimination characteristic is secured between switch 46 and the grid of the tube 50 at the frequency for which the capacitative reactance is equal to the resistance in the arms of the bridge. We position the point of maximum attenuation approximately 17% higher in frequency than the speed of rotation of the horizontal camshaft. Since there is an across and a back throw of the mirror 2 for each revolution of this camshaft a second harmonic vibration is also present.

In Fig. 4, for either alternate, capacitor 62 is relatively small, resulting in attenuation of low frequencies; a known independent parameter of resistance-capacitance coupled amplifiers. This characteristic, with also either alternate, results in low response at both the fundamental and second harmonic. The elimination by electrical means of the effects of this and other random vibration is of particular importance when the infra-red detector of our copending application 630,532 is used, having increased the sensitivity of and contributed to simplification of that device.

Capacitor 63, in Fig. 4, limits the upper electrical response of the equipment and reduces high frequency spurious effects, as is known.

Rectangle 64 diagrammatically represents an electronically regulated power supply. This constitutes a voltage source of effectively zero internal impedance and supplies plate voltage of the order of 300 volts to the several circle terminals throughout the diagram. This zero impedance characteristic is of importance in apparatus of this sort. The repetition rate of the scanning is often low, five to ten per second. At such frequencies even electrolytic capacitors of large value do not provide sufficient basic filtering to prevent the varying current drain of the vertical synchronizing and scanning circuits from altering the voltage output of the power supply. Should this happen, we have found that a delayed spurious pulse appears in the image field, being introduced through the low level circuits.

Figure 6:
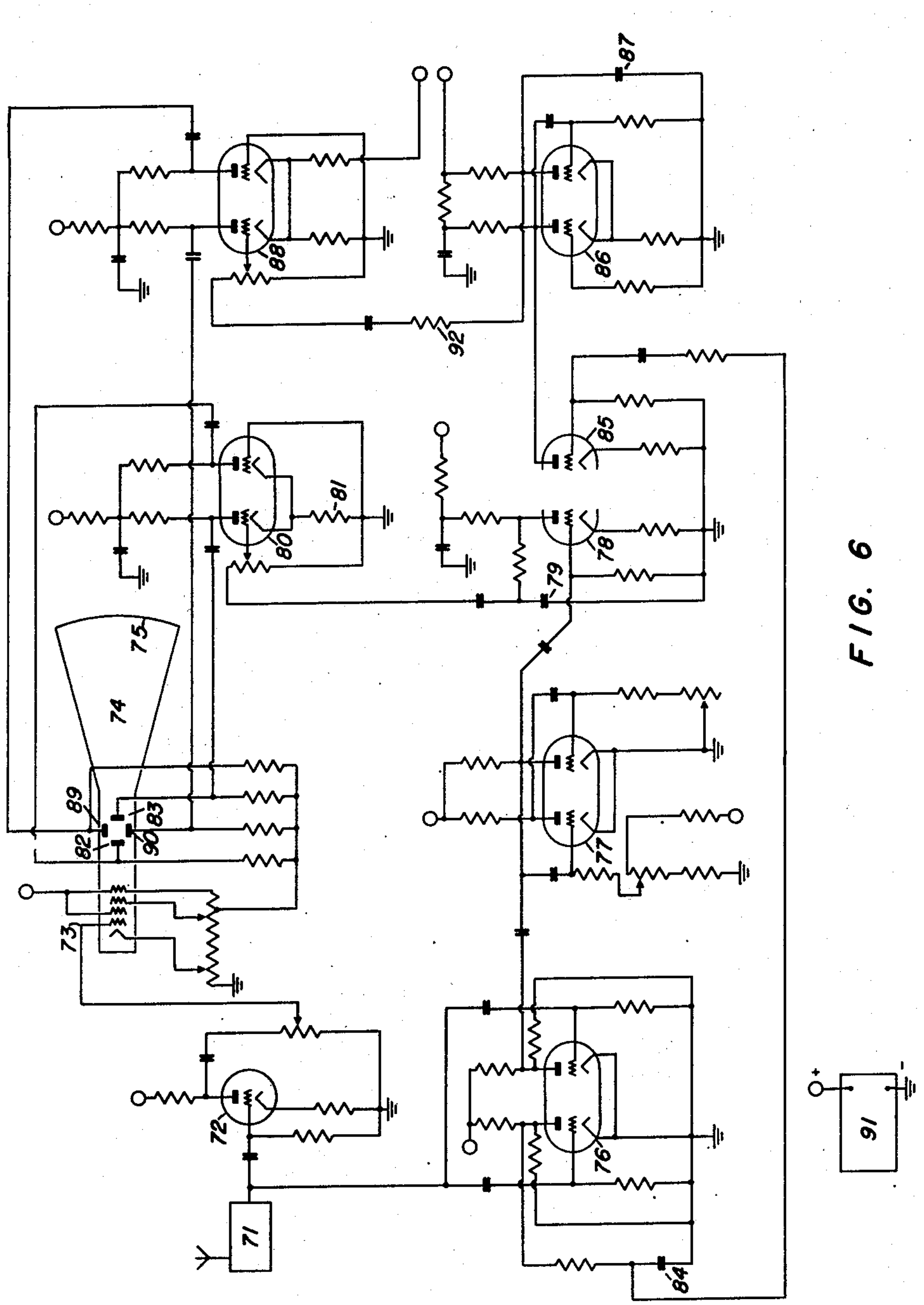
Fig. 6 shows the schematic diagram of the electrical circuits of the viewing unit.

Referring now to Fig. 6, rectangle 71 indicates a radio receiver which is adapted to receive and demodulate the radiated waves of transmitter 61 of Fig. 4. It is to be understood that the transmitter-receiver instrumentalities can be dispensed with and the information conveyed by a wire attached to the input terminal of the transmitter and the output terminal of the receiver plus the ground return connection.

The receiver output contains video, blanking and synchronizing information. This is amplified by tube 72 and applied in positive phase to the grid 73 of cathode-ray tube 74. Here the positive video signals increase the grid potential sufficiently to give visible traces on the fluorescent screen 75 whereas the blanking and synchronizing pulses decrease the grid potential beyond cut-off and thus prevent any visible trace on the fluorescent screen.

Tube 76 and associated components constitutes a synchronization pulse separator-clipper. Note that the input signal is fed in negative phase from the input to tube 72, consequently the synchronizing pulses are the most positive part of the signal and are the only part of the waveform which appears in the output. The process is according to the Lubcke Patent 2,055,748, dated September 29, 1936.

The horizontal synchronizing pulses are conveyed to one plate of the horizontal square wave oscillator tube 77. When thus synchronized, this oscillator produces a square wave having one throw for each throw of mirror 2. We have found it preferable to synchronize this multivibrator oscillator once each cycle rather than once each throw. This prevents unsteadiness of the image raster on the cathode-ray tube. There is, therefore only one conductive segment on the horizontal synchronizing commutator 31 in Fig. 4, although there are two blanking segments on the blanking portion 29.

We have also found it desirable to take the output of oscillator 77 from the same plate which we synchronize. Tube 78 is overdriven and clips both top and bottom of the oscillator square wave, giving a sharply rectangular wave at the output. Shunt capacitor 79 integrates the rectangular wave to a triangular wave. This wave is impressed upon the double triode vacuum tube 80 which gives a push-pull output by virtue of the right hand section being fed from the common cathode resistor 81. This output is impressed upon the horizontal deflection plates 82 and 83 of cathode-ray tube 74. The cathode-ray tube electron stream is thus deflected horizontally in synchronism with the horizontal motion of mirror 2.

Figure 7:
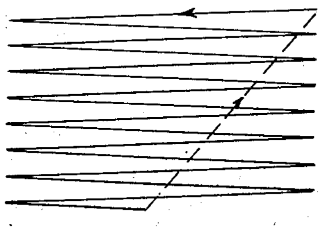
Fig. 7 shows a sketch of the raster.

The vertical synchronizing pulses are taken from the left hand plate of tube 76. The higher frequency horizontal synchronizing pulses are removed from this channel by shunt capacitor 84. The vertical pulses are then amplified by tube 85 and impressed upon the left hand plate of tube 86. The latter is a relaxation oscillator which gives a sawtooth waveshape output directly by virtue of shunt capacitor 87. This output is impressed upon tube 88, a push-pull amplifier of the same type as previously described tube 80. The output of tube 88 is impressed upon the vertical deflection plates 89 and 90 of cathode-ray tube 74. The cathode-ray tube electron stream is thus deflected vertically in synchronism with the vertical motion of mirror 2. The raster, or trace of the electron stream in two dimensions, is shown in Fig. 7. The raster may have more lines than shown. This is an independent variable determined by the gear ratio between the horizontal camshaft 11 and vertical camshaft 12 in Fig. 2. The electron stream follows the ratio chosen because the commutator-produced synchronizing pulses retain the electronic oscillators in step.

Rectangle 91 in Fig. 6 indicates a plate supply power unit, preferably regulated. All plate electrodes including that of the cathode-ray tube are supplied from this unit through implied connections between the circle terminal on the top of the unit and the numerous similar circle terminals throughout the schematic diagram.

In Figs. 4, 5 and 6, circuit elements not specifically identified are according to the knowledge of one skilled in the art when combined with the teaching of this specification. The heater electrodes in the vacuum tubes, for instance, are omitted for brevity, according to present custom in the preparation of schematic diagrams.

Figure 8:
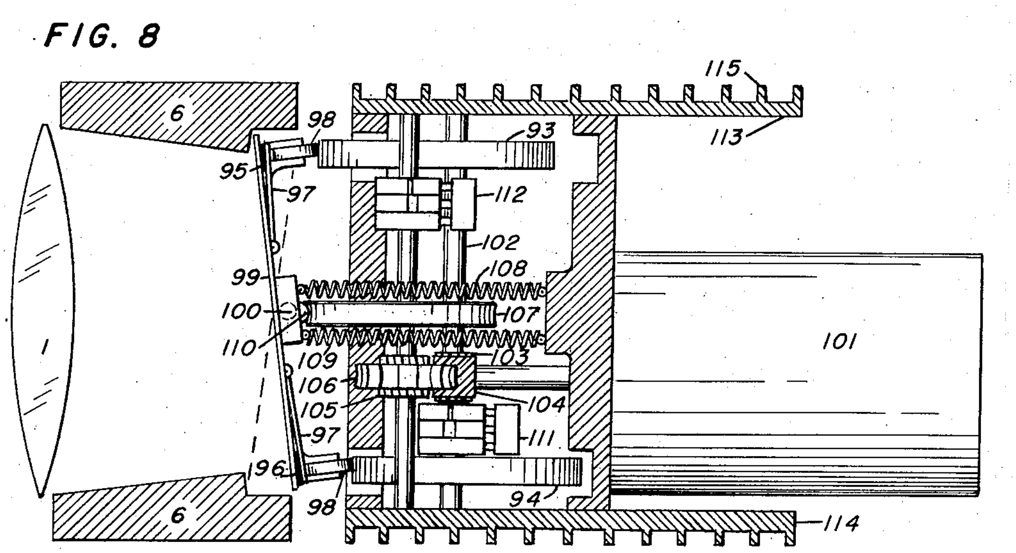
Fig. 8 shows a plan view of an alternate model scanner.

Fig. 8 shows an alternate embodiment of the prime mover for the scanner. Radial, rather than axial, cams 93 and 94 are employed with cushion members 95 and 96 behind pivoted follower arms 97 and mirror 99. The cushions are of high grade rubber used in compression to cause ball bearing followers 98 to keep in contact with cams 93 and 94. This accomplishes automatic takeup for wear and what is more important, normalizes the kinematic linkage to accommodate second order variations caused by the disposition of the parts through a complete scanning cycle. When the extremes of both horizontal and vertical deflections are reached the geometry of the mechanism is slightly different than for merely the extremes of the horizontal deflections, the latter being campatible kinematically. With the rubber cushions set up with a nominal stress by suitable adjustment of universal joint 100 the kinematic variations are absorbed by deformation of the rubber and the folowers remain in intimate contact with the cams.

Continuing to refer to Fig. 8 the motor 101 drives the horizontal camshaft 102 through spiral cross-gears 103 and 104. Also on the motor shaft, worm 105 drives worm-gear 106 which is located on the vertical (deflection) camshaft. The vertical cam 107 is also of the axial type, having a gradual rise against springs 108 and 109 and a peripheral slot which retains hardened ball 110. This latter constitutes a traveling ball and socket arrangement and allows the mirror 99 to deflect horizontally and vertically without restraint. Commutator-brush assembly 111 originates horizontal synchronizing and blanking impulses and assembly 112 originates vertical pulses the same as the corresponding assemblies 23—24 and 25—26 in previously described scanner, Fig. 2. The side plates 113—114 have ribs 115 to assist in cooling the device. Mirror 99 is optically equivalent to mirror 2 of Fig. 1 and the alternate scanner is interchangeable with that of Fig. 1 in the camera.

Having thus fully disclosed our invention, we claim:

1. In a television apparatus wherein a radiant energy image of the field of view is formed and moved in two dimensions over a sensitive area of elemental size, a scanning device, means sensitive to said radiant energy, a housing enclosing said apparatus and means for preventing spurious signals which comprises means for conveying the radiant energy through a heterogeneous duct having surface characteristics homogeneous with respect to said radiant energy which is shaped to cause all radiant energy which falls upon said sensitive area to have originated in the field of view.

2. In a television apparatus, a housing enclosing said apparatus means for collecting radiant energy from a field of view, means to move said collected radiant energy as a whole, a device sensitive to said radiant energy and having a sensitive area of elemental size, means for forming a moving image of said field of view from said moving whole radiant energy in the plane of said sensitive area and a reflective surface surrounding the path of said radiant energy between the recited means, said surface shaped to cause all radiant energy which falls upon said sensitive area to have originated in the field of view.

3. In a television apparatus, a housing enclosing said apparatus, an optical system of high efficiency and small size comprised of a radiant energy permeable lens of wide aperture with respect to focal length, a mirror behind said lens, inclined at an angle thereto, of sufficient size to intercept the whole cone of radiant energy collected by said lens and adapted to oscillate in two dimensions, a device sensitive to radiant energy and having a sensitive area of elemental size positioned in the plane of the image formed by said lens-mirror combination and a reflective surface surrounding the path of radiant energy between said mirror and said lens, said surface shaped to cause all radiant energy which falls upon said sensitive area to have originated in the field of view.

4. In a television apparatus, a housing enclosing said apparatus, an optical system of high efficiency and small size comprised of a lens of wide aperture with respect to focal length adapted to form an image of radiant energy collected from a field of view, a mirror behind said lens, inclined at an angle thereto, of sufficient size to intercept the whole cone of radiant energy collected by said lens and adapted to oscillate in two dimensions, a second mirror, stationary, and positioned to intercept the whole oscillating cone of radiant energy, a device sensitive to radiant energy and having a sensitive area of elemental size positioned in the plane of the image formed by said combination of lens and mirrors and a reflective surface surrounding but not intercepting the path of radiant energy between said mirror and said lens.

5. In a television apparatus, a housing enclosing said apparatus, a lens, a mirror adapted to vibrate in plural dimensions, and a device sensitive to incoming radiant energy and having a sensitive area of elemental size, a side-scan shield enclosing the path of the radiant energy rays between the lens and the mirror, the inner surface thereof being reflective.

6. In a television apparatus, a housing enclosing said apparatus, a lens, a mirror vibrating in plural dimensions, and a device sensitive to incoming radiant energy and having a sensitive area of elemental size, a side-scan shield enclosing the path of the radiant energy rays between the lens and the mirror, the inner surface thereof being reflective; said shield having a large thermal capacity and being formed of a material having a large value of thermal conductivity.

7. In a television apparatus; a lens, a mirror vibrating in plural dimensions and a device sensitive to the incoming radiant energy and having a sensitive area of element size, a side-scan shield enclosing the path of rays of radiant energy between the lens and the mirror, having a reflective inner surface of the same characteristics as the mirror and extending beyond the same in a form enclosing the mirror and preventing said rays from impinging upon the edge of said mirror or passing beyond the same to a surface of other characteristics.

8. In a television apparatus; a lens, a mirror vibrating in plural dimensions, a device sensitive to incoming radiant energy having an elemental sensitive area, a side-scan shield enclosing the path of the radiant energy rays between the lens and the mirror, the inner surface of said shield being reflective, and means for producing and directing a flow of air around said mirror and said shield thereby to maintain these elements at substantially uniform temperature.

9. A mechanical scanning device, means for driving same, means for developing electrical signals as a result of the scansion, amplifying means for amplifying a band of frequencies including the frequency of vibration of said device; amplifying means for amplifying only said vibration frequency, means for combining the outputs of said amplifying means in phase opposition and at equal amplitudes for the removal of the vibration frequency from the resultant output.

10. In a television apparatus; an optical system, driving means for vibrating an element of said optical system, means giving spurious response to vibration, electronic amplifying means adapted to amplify a band of frequencies including the frequency of vibration of said element; a bridge circuit in cascade with said amplifying means, an input connection to said bridge at a junction between resistive and reactive elements and an output connection from said bridge at a similar but opposite junction, the bridge being balanced appreciably higher than at the frequency of vibration of said element of the optical system whereby only a small fraction of the input signal to the bridge appears at the output thereof at that frequency.

11. In a television apparatus; an optical system, comprised of a lens, a mirror, a sidescan shield enclosing the path of the radiant energy rays between the lens and the mirror, and a device sensitive to incoming radiant energy; amplifying means, cathode-ray tube viewing means; a driving means for rectilinearly moving said mirror in plural dimensions, comprised of a prime mover, a cam connected thereto, followers riding thereon adapted to move said mirror in one dimension, a speed reducing means connected to said prime mover, a cam connected to said reducing means, a follower riding on said cam adapted to move said mirror in a second dimension, a universal joint connecting said mirror to said driving means, electrical contacting means mechanically connected to each of said cams and electrically connected to said cathode-ray tube for the synchronization thereof.

12. In a television apparatus; an optical system, comprised of a lens, a mirror, a sidescan shield enclosing the path of the radiant energy rays between the lens and the mirror, and a device sensitive to incoming radiant energy; amplifying means, synchronizing means and image reproducing means; a driving means for rectilinearly moving said mirror in plural dimensions comprised of, a prime mover, cams connected thereto, followers resiliently attached to said mirror and bearing upon said cams, said resilient attachment being adapted to accommodate motion of the mirror in plural dimensions and to prevent extraneous motion caused by slack in the recited kinematic chain.

13. In a television apparatus, an optical system comprised of a lens, a mirror, a sidescan shield enclosing the path of the radiant energy rays between the lens and the mirror, and a device sensitive to incoming radiant energy, a driving means for moving said mirror in plural dimensions comprised of a prime mover, a cam connected thereto, followers riding thereon adapted to move said mirror in one dimension, a speed reducing means connected to said prime mover, a cam connected to said speed reducing means having a gradual rise and a rapid fall, a follower thereon adapted to move said mirror in a second dimension, a spring adapted to resist said rise and assist said fall, said mirror attached to said driving means by a universal joint.

14. In a television apparatus, an optical system comprised of a lens, a mirror, a sidescan shield enclosing the path of the radiant energy rays between the lens and the mirror, and a device sensitive to incoming radiant energy; a driving means for moving said mirror in plural dimensions comprised of, a prime mover, cams connected thereto, followers riding thereon, a frame, members capable of withstanding a tensile stress connecting said mirror to said followers, a universal joint attached to said mirror and resiliently attached to said frame, said resilient attachment imposing said tensile stress on said members.

15. In a television apparatus, an optical system comprised of a lens, a mirror, a sidescan shield enclosing the path of the radiant energy rays between the lens and the mirror, and a device sensitive to incoming radiant energy, driving means for rectilinearly moving said mirror in plural dimensions; amplifying means, image reproducing means, a synchronizing system comprised of electrical contact means coactively connected to said driving means and adapted to actuate at each extreme deflection of each cycle of the motion of said mirror in each of plural directions, waveform shaping circuits in said amplifying means actuated by said contact means, the output of said shaping means being impressed upon said reproducing means for the synchronization thereof.

16. In a television apparatus, means including a cyclically rectilinearly moving mirror for producing an electrical representation of variations of intensity of radiant energy over a field of view, a sidescan shield enclosing the path of the radiant energy rays between the lens and the mirror, means for producing synchronizing information demarking the maximum excursions of said mirror, electronic amplifying means connected to both of said prior means, a source of unidirectional current having appreciable inherent impedance at the frequency of the movement of said mirror, electronic voltage regulatory means coactively connected to said source and adapted to maintain the voltage supplied to said amplifying means constant regardless of the varying current demands of said amplifying means at the frequency of the movement of said mirror.

17. In a television apparatus; an optical system comprised of a lens, a mirror, a sidescan shield enclosing the path of the radiant energy rays between the lens and the mirror, and a device sensitive to incoming radiant energy, driving means for rectilinearly moving said mirror in plural dimensions, electronic amplifying means having vacuum tubes connected to said sensitive device, synchronizing means actuated by said driving means and connected to the input terminals of a vacuum tube, the output terminals of said tube connected to the cathode circuit of one of the vacuum tubes of said amplifying means, said connected vacuum tubes being thereby adapted to combine information originating in said synchronizing means with that originating in said sensitive device.

18. A television apparatus comprising; a lens, a mirror, a sidescan shield enclosing the path of the radiant energy rays between the lens and the mirror, a device capable of receiving a radiant energy input and delivering an electrical energy output, means to rectilinearly drive said mirror in plural dimensions as a function of time save at the limits of the excursions of said mirror, a cathode-ray tube, electronic amplifying means connected to the output of said radiant energy device and to the intensity control element of the cathode-ray tube, electromechanical means mechanically connected to said driving means to demark the limits of the excursions of said mirror and electrically connected to said amplifying means to paralyze the same for an interval including the time directly prior to, during, and directly after the limits of said excursions; further electromechanical means to demark the maxima of the excursions, synchronously coacting wave-shaping circuits connected thereto and to the deflection means of said cathode-ray tube.

19. A television apparatus comprising; a lens, a mirror, a sidescan shield enclosing the path of the radiant energy rays between the lens and the mirror, and a device sensitive to incoming radiant energy, driving means for moving said mirror essentially rectilinearly as a function of time in one dimension according to a triangular waveform and in a dimension at right angles thereto according to a sawtooth waveform, plural electrical contactor means coactively connected to said driving means and adapted to produce an impulse before each scansion of the mirror, one said impulse consisting of a square waveform in synchronism with said triangular waveform, and another said impulse consisting of a short pulse waveform in synchronism with said sawtooth waveform, electrical integrating means connected to each of said contactor means for converting said square waveform into a triangular waveform, and said pulse waveform into a sawtooth waveform, a cathode-ray tube having electron stream deflection means, an amplifier adapted to amplify the output of each of said integrating means and impress the waveforms thereof on said deflection means; the motion of the electron stream being spatially congruent to and synchronously executed with the motion of said mirror.

20. A television apparatus comprising; a lens, a mirror, driving means adapted to rectilinearly vibrate said mirror in two dimensions, a reflecting inclosure surrounding the optical path between said lens and mirror, a radiant-energy sensitive device positioned at the focal plane of said lens and adapted to transform said radiant energy to electrical energy, said inclosure shaped to cause all radiant energy which falls upon said sensitive device to have originated in the field of view, electronic amplifying means, the electrical output of the sensitive device connected to said amplifying means, a cathode-ray tube having an electron stream, and intensity control and deflection means therefor, said amplifying means connected to said intensity control means, electromechanical means coactively connected to said mirror driving means to demark the maximum complete cyclical excursions of said mirror, synchronously coacting wave-shaping circuits connected thereto and to said deflection means.

21. A television apparatus comprising; a lens, a mirror, a reflecting inclosure of large thermal capacity and of high thermal conductivity surrounding the optical path between said lens and mirror, means for directing an air flow over said mirror and inclosure, a radiant energy sensitive device positioned at the focal plane of said lens and adapted to transform said radiant energy to electrical energy, said inclosure shaped to cause all radiant energy which falls upon said sensitive device to have originated in the field of view, electronic amplifying means including plural vacuum tubes, a cathode-ray tube having an electron stream and intensity control and deflection means therefor, the input of said amplifying means connected to the electrical output of said sensitive device, the output of said amplifying means connected to the intensity control of said cathode ray tube, driving means for rectilinearly moving said mirror in two directions comprised of a prime mover, a cam connected thereto and followers riding thereon adapted to move said mirror rectilinearly in one direction, a speed reducing means connected to said prime mover, a cam connected to said reducing means having a gradual rise and a rapid fall and a follower thereon adapted to move said mirror rectilinearly in a second direction, a spring adapted to resist said rise and assist said fall, a universal joint connecting said mirror to said driving means, commutator-brush means mechanically connected to said driving means to demark the limits of the excursions of said mirror and electrically connected to said amplifying means to paralyze the same for an interval during the limits of said excursions, said electrical connection being to the cathode of a vacuum tube of said amplifying means, further commutator-brush means to demark the maxima of the excursions, synchronously coacting wave-shaping means adapted to produce electrical waveforms corresponding to the motion of said mirror as a function of time connected to said further means and to said deflection means, auxiliary amplifying means comprising a parallel channel to said electronic amplifying means, said auxiliary means adapted to amplify only the electrical frequency corresponding to the more rapid motion of said mirror, and means for combining the outputs of said amplifying means in phase opposition and amplitude equality at said rapid frequency for the removal thereof from the combined output.

22. The method of developing signals for television transmission of variations of intensity of radiant energy over a field of view in the presence of similar energy radiated within the pick-up device which comprises the steps of collecting radiant energy from said field of view, conveying said energy through a path in said device, obscurating said similar energy from said path, inhibiting radiation from matter adjacent said path, rectilinearly deflecting said collected energy in two dimensions and forming electrical variations corresponding to the intensity variations transmitted through a stationary aperture of elemental area located in the path of said deflected energy.

HARRY R. LUBCKE.
HAROLD W. JURY.

References Cited in the file of this patent

UNITED STATES PATENTS

| Number | Name | Date |
|---|---|---|
| Re. 18,761 | Centeno | Mar. 7, 1933 |
| 1,781,800 | Baird | Nov. 18, 1930 |

| Number | Name | Date |
|---|---|---|
| 1,814,382 | Gustafson | July 14, 1931 |
| 1,824,731 | Moore | Sept. 22, 1931 |
| 1,863,363 | Zworykin | June 14, 1932 |
| 1,870,465 | Rathbun | Aug. 9, 1932 |
| 1,897,219 | Schroter | Feb. 14, 1933 |
| 1,910,540 | Hammond | May 23, 1933 |
| 1,955,320 | Batchelor | Apr. 17, 1934 |
| 2,021,907 | Zworykin | Nov. 26, 1935 |
| 2,034,583 | Koch | Mar. 17, 1936 |
| 2,136,789 | Finch | Nov. 15, 1938 |
| 2,395,099 | Cage | Feb. 19, 1946 |
| 2,410,317 | Tolson | Oct. 29, 1946 |